United States Patent

[11] 3,620,712

[72] Inventor Edward J. Conklin
 Forest Park, Ohio
[21] Appl. No. 786,761
[22] Filed Dec. 24, 1968
[45] Patented Nov. 16, 1971
[73] Assignee The Proctor & Gamble Company
 Cincinnati, Ohio

[54] SINGLE PHASE COMPOSITION
 10 Claims, No Drawings
[52] U.S. Cl. .................................................. 71/106,
 71/78, 71/DIG. 1
[51] Int. Cl. .................................................. A01n 9/24
[50] Field of Search ........................................... 71/78, 106

[56] References Cited
 UNITED STATES PATENTS
3,057,804 10/1962 Berkeley et al. .............. 252/118
3,326,664 6/1967 Tso ................................ 71/78
3,340,040 9/1967 Tso ................................ 71/78

OTHER REFERENCES

Tso et al., " Inhibition of Tobacco Axillary Bad Growth, etc.," (1965) J. Ag. Food Chem. 13, pp. 78– 81 (1965)

Temple et al., " The Effect of Surfactants on the Water Sal. etc.," (1963) Weeds, Vol. 11, No. 4, pp. 297– 300 (1963)

McCutcheon, " Detergents & Emulsifiers 1966 Ann.," p. 210 (1966) TP990 D4

Jansen et al., " Effects of Surfactants on the Herb. Act. etc.;" (1961) Weeds, Vol. 9, No. 3, pp. 381– 384 and 390.

Primary Examiner—Lewis Gotts
Assistant Examiner—G. Hollrah
Attorneys—Robert B. Aylor and Richard C. Witte ABSTRACT: Single phase compositions consisting essentially of methyl esters of $C_6$–$C_{12}$ fatty acids and specific nonionic emulsifiers in a ratio of esters to emulsifiers of from about 1:1.2 to about 3:1, said composition being coupled by a critical amount of water.

SINGLE PHASE COMPOSITION

FIELD OF THE INVENTION

This invention relates to concentrated compositions which when diluted with water form stable emulsions suitable for application to plants to kill meristematic tissue without damaging mature tissue or subsequent plant growth. (E.g., as chemical "pinching" agents for ornamental plants, trees and flowers.) Such compositions are prepared at a central location and sold to the eventual user who prepares a more dilute aqueous emulsion. Accordingly it is desirable to have single phase compositions which are homogeneous on a molecular scale to permit the eventual user to accurately measure the amount of material being used. It is also esthetically desirable to have a clear single phase composition.

PRIOR ART

It is known to form stable emulsions of methyl esters of fatty acids for various purposes including their use as chemical pinching agents. See, e.g., Science, Vol. 153, pp. 1,282–3 (16 Sept. 1966) and Chemical Pinching Agents for Azaleas, a publication of the University of California Agricultural Extension Service (Oct. 1967). However, it has not heretofore been disclosed how to form a clear, single-phase concentrated composition containing $C_6$–$C_{12}$ fatty acid methyl esters and emulsifiers therefor, which when diluted will form emulsions useful as chemical pinching agents for ornamental plants, trees and flowers, e.g., azaleas.

SUMMARY OF THE INVENTION

The clear, single-phase concentrated compositions of this invention which are suitable for dilution with water to form emulsions for use as chemical pinching agents for plants consist essentially of:
A. a mixture of
1. methyl ester of straight chain saturated fatty acid containing from about six to about 12 carbon atoms and
2. fatty acid ester of polyethoxylated sorbitan wherein the fatty acid contains from about ten to about 18 carbon atoms and wherein there are from about five to about 80 ethoxy moieties per molecule; the ratio of said methyl esters to said fatty acid esters of polyethoxylated sorbitan being from about 3:1 to about 1:1.2; and
B. as a coupling agent to make said composition clear and single-phase, from about 4 percent to about 16 percent of water by weight of the total composition.

THE METHYL ESTER

Methyl esters of fatty acids useful in the preparation of the compositions of this invention include methyl hexanoate, methyl heptanoate, methyl octanoate, methyl nonanoate, methyl decanoate, methyl undecanoate, methyl dodencanoate, and mixtures thereof. The most effective chemical pinching agents are the methyl octanoate, methyl nonanoate and methyl decanoate. Accordingly, these methyl esters are preferred. A preferred mixture of methyl esters is a mixture of methyl octanoate and methyl decanoate containing from 0 to about 75 percent by weight of methyl octanoate. A more preferred mixture contains from about 50 percent to about 60 percent methyl octanoate and from about 35 percent to about 45 percent methyl decanoate. It is understood that small amounts of fatty acid esters containing fatty acids having less than six and more than 12 carbon atoms can be used, but this is generally undesirable and should be minimized. The source of the fatty acids used is not critical and can be either a natural source such as coconut oil or a synthetic source.

THE EMULSIFIER

The emulsifiers for the methyl esters in the aqueous emulsions (chemical pinching agents) formed from the concentrated compositions of this invention are fatty acid esters of polyethoxylated sorbitan. Suitable fatty acids useful in forming the esters of polyethoxylated sorbitan include: decanoic, undecanoic, dodecanoic, tridecanoic, tetradecanoic, pentadecanoic, hexadecanoic, heptadecanoic, octadecanoic, and octadecanoic acids or mixtures thereof. From about 10 to about 30 ethoxy moieties per molecule are preferred for ease of formulation and effectiveness of the diluted composition as hereinafter described as a chemical pinching agent. Preferred emulsifiers which give the most stable emulsions for use as chemical pinching agents with minimum plant damage (phytotoxicity) are: dodecanoate ester of polyethoxylated sorbitan containing an average of about 20 ethoxy moieties per molecule; oleate ester of polyethoxylated sorbitan containing an average of about 20 ethoxy moieties per molecule; and dodecanoate ester of polyethoxylatd sorbitan containing an average of about five ethoxy moieties per molecule. The most preferred emulsifier is the dodecanoate ester of polyethoxylated sorbitan containing an average of about 20 ethoxy moieties per molecule.

The preferred ratio of methyl ester to emulsifier (fatty acid ester of polyethoxylated sorbitan) is from about 2:1 to about 1:1.2 and the most preferred ratio is about 1:1. These ratios are preferred for maximum pinching at minimum phytotoxicity.

The preferred amount of water is from about 6 percent to about 12 percent by weight of the composition and the most preferred amount is about 10 percent by weight of the composition. These amounts of water allow leeway in formulation without danger of creating a two-phase system.

The compositions of this invention can be readily diluted with water, either by adding water to the composition or by adding the composition to water for form stable aqueous emulsions containing from about 2 percent to about 12 percent of the methyl ester. These emulsions are especially adapted for application to a wide variety of shrubs, trees and flowers for the purpose of killing meristematic tissue and thereby accomplishing the "pinching" without adverse effect on mature tissues or subsequent plant development. Examples of plants which can be treated are: ageratum, coleus, cotton, marigold, peanut, snapbean, snapdragon, soybean, tomato, carnation, chrystanthemum, forsythia, geranium, apple, azalea, chamecyparis, elm, eyonymous, juniper, kolkwitzia, ligustrum, lonicera, maple, paper birch, pyrancantha, taxus, weigela and pear.

All parts, percentages and ratios herein are by weight unless otherwise stated.

EXAMPLE I

The following table defines formulas of compositions which illustrate the invention.

tional water was added to make the total amount of water about 16.8 percent by weight of the composition, the composition again became cloudy indicating the presence of a second phase.

| | Composition | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Methyl Ester | 45 | 48 | 42 | 45 | 45 | 45 | 45 | 47 | 45 | 60 | 60 | 60 | 46 | 55 | 50 | 47 | 49 | 40 |
| Distribution by weight: | | | | | | | | | | | | | | | | | | |
| Methyl hexanoate | 4 | 4 | 4 | | | | | 4 | 4 | 4 | | | | 4 | 4 | 4 | 4 | |
| Methyl heptanoate | | | | | | 5 | | | | | 5 | | | | | | | |
| Methyl octanoate | 56 | 56 | 56 | 3 | 2 | 20 | 30 | 56 | 56 | 56 | 30 | 3 | 3 | 20 | 56 | 56 | 56 | 56 |
| Methyl nonanoate | | | | | 95 | 40 | 30 | | | | 30 | | 40 | | | | | |
| Methyl decanoate | 38 | 38 | 38 | 95 | 3 | 40 | 30 | 38 | 38 | 38 | 30 | 95 | 95 | 40 | 38 | 38 | 38 | 38 |
| Methylundecanoate | | | | | | 5 | | | | | 5 | | | | | | | |
| Methyl dodecanoate | 2 | 2 | 2 | 2 | | | | 2 | 2 | 2 | | 2 | 2 | | 2 | 2 | 2 | 2 |
| Polyoxyethylene (20) sorbitan mono(1-octadecenoate) (Tween 80) | | | | | | | | 45 | | 25 | | 30 | | | | | | |
| Polyoxyethylene (20) sorbitan monododecanoate (Tween 20) | 45 | 48 | 42 | 45 | 45 | 45 | | | | | 30 | 30 | | 46 | 38 | 38 | 47 | 49 | 40 |
| Polyoxyethylene (5) sorbitan monododecanoate (Tween 21) | | | | | | | | 47 | 20 | | | | | | | | | |
| Water | 10 | 4 | 16 | 10 | 10 | 10 | 10 | 6 | 10 | 10 | 10 | 10 | 8 | 7 | 12 | 6 | 2 | 20 |

Compositions 1–16 are clear, single-phase compositions which when diluted with water give stable emulsions useful as chemical pinching agents. For example, when any of the compositions 1–16 are mixed with water to give an emulsion containing about 4 percent methyl ester and are thereafter applied (to the point where the emulsion runs off the plant) to azalea plants which have grown for about nine weeks since their last pinching the azalea plants are "pinched" without appreciable damage to the total plant.

Compositions 17 and 18 are outside the scope of this invention and contain two phases despite the fact that they are only just outside the limits.

EXAMPLE II

1:1 mixtures of the following combinations of ingredients, which were all cloudy, indicating the presence of more than one phase, were titrated at room temperature with water to the point of clearing into one phase and then on to the next point where the composition again became cloudy.

| | Percent water | |
|---|---|---|
| | Clearing point | Cloud point |
| Tween 20<br>Methyl octanoate (95%) | 5.0 | 16.6 |
| Tween 20<br>Methyl decanoate (95%) | 3.4 | 14.9 |
| Tween 80<br>Methyl ester of Composition 1 of Example I | 4.8 | 13 |
| Tween 21<br>Methyl ester of Composition 1 of Example I | 5.8 | 6.3 |

The above data indicate that within the range of from about 4 percent to about 16 percent water by weight of the composition, it is possible to clarify mixtures of methyl esters and fatty acid esters of polyethoxylated sorbitan (emulsifier) as hereinbefore described. However, it should be noted that with some of the emulsifier/methyl ester combinations, the range of the amount of water required to couple (clarify) the composition is smaller than the range from about 4 percent to about 16 percent by weight of the composition. Accordingly, a certain amount of variation can be expected within the broad range set forth herein. It should also be noted that some water can be introduced with the emulsifier and/or methyl ester.

EXAMPLE III

Tween 20 was titrated at room temperature with the mixture of methyl esters of composition 1 in example I. At a ratio of approximately 1:1.2 methyl ester/Tween 20, the composition became cloudy indicating the presence of a second phase. After the composition became cloudy, the mixture was titrated with water to find that at approximately 5.1 percent water by weight of the composition the composition became clear indicating the formation of a single phase. After addi- Since ratios of methyl ester to emulsifier (Tween 20) above 3:1 are not desirable for the preparation of emulsions useful as chemical pinching agents, these ratios were not explored, but within the range from about 1:1.2 to about 3:1 methyl ester/Tween 20, the compositions were two phase unless coupled with from about 4 percent to about 16 percent water by weight of the composition.

What is claimed is:

1. Clear, single-phase concentrated composition suitable for dilution with water to form emulsions for use as chemical pinching agents for plants consisting essentially of:
   A. a mixture of
      1. methyl ester of straight chain saturated fatty acid containing from about six to about 12 carbon atoms and
      2. fatty acid ester of polyethoxylated sorbitan wherein the fatty acid contains from about 10 to about 18 carbon atoms and wherein there are from about five to about 80 ethoxy moieties per molecule; the ratio of said methyl esters to said fatty acid esters of polyethoxylated sorbitan being from about 3:1 to about 1:1.2; and
   B. as a coupling agent to make said composition clear and single-phase, from about 4 percent to about 16 percent of water by weight of the total composition.

2. The composition of claim 1 wherein the methyl ester is selected from the group consisting of methyl octanoate, methyl nonanoate, and methyl decanoate.

3. The composition of claim 1 wherein the fatty acid ester of polyethoxylated sorbitan is selected from the group consisting of dodecanoate ester of polyethoxylated sorbitan containing an average of about 20 ethoxy moieties per molecule; oleate ester of polyethoxylated sorbitan containing an average of about 20 ethoxy moieties per molecule; and dodecanoate ester of polyethoxylated sorbitan containing an average of about five ethoxy moieties per molecule.

4. The composition of claim 1 wherein the ratio of methyl ester to fatty acid ester of polyethoxylated sorbitan is about 1:1.

5. The composition of claim 1 containing from about 6 percent to about 12 percent water.

6. The composition of claim 1 wherein the methyl ester is selected from the group consisting of methyl decanoate and mixtures of methyl decanoate and methyl octanoate containing no more than 75 percent by weight of methyl octanoate.

7. The composition of claim 6 containing from about 50 percent to about 60 percent methyl octanoate and from about 35 percent to about 45 percent methyl decanoate.

8. The composition of claim 7 wherein the fatty acid ester of polyethoxylated sorbitan is dodecanoate ester of polyethoxylated sorbitan containing an average of about 20 ethoxy moieties per molecule.

9. The composition of claim 8 wherein the ratio of methyl ester to fatty acid ester of polyethoxylated sorbitan is about 1:1.

10. The composition of claim 9 containing about 10 percent water.

* * * * *

PO-1050
(5/69)

UNITED STATES PATENT OFFICE
CERTIFICATE OF CORRECTION

Patent No. 3,620,712   Dated November 16, 1971

Inventor(s) Edward J. Conklin

It is certified that error appears in the above-identified patent and that said Letters Patent are hereby corrected as shown below:

On the front page, Assignee, "The Proctor & Gamble Company" should read --The Procter & Gamble Company--.

Column 1, line 21, "1,282-3" should read --1,382-3--.

Signed and sealed this 13th day of June 1972.

(SEAL)
Attest:

EDWARD M. FLETCHER, JR.　　　　　　　　ROBERT GOTTSCHALK
Attesting Officer　　　　　　　　　　　　Commissioner of Patents